(12) United States Patent
Zähe (10) Patent No.: US 11,680,589 B1
(45) Date of Patent: Jun. 20, 2023

(54) SEQUENCE VALVE WITH A REVERSE FREE FLOW CONFIGURATION INTEGRATED THEREWITH

(71) Applicant: Sun Hydraulics, LLC, Sarasota, FL (US)

(72) Inventor: Bernd Zähe, Sarasota, FL (US)

(73) Assignee: Sun Hydraulics, LLC, Sarasota, FL (US)

(*) Notice: Subject to any disclaimer, the term of this patent is extended or adjusted under 35 U.S.C. 154(b) by 0 days.

(21) Appl. No.: 17/589,947

(22) Filed: Feb. 1, 2022

(51) Int. Cl.
| | |
|---|---|
| *F15B 13/07* | (2006.01) |
| *F16K 31/363* | (2006.01) |
| *F16K 15/06* | (2006.01) |
| *F15B 1/26* | (2006.01) |
| *F15B 13/02* | (2006.01) |
| *F15B 11/20* | (2006.01) |
| *F15B 11/16* | (2006.01) |

(52) U.S. Cl.
CPC ............ *F15B 13/07* (2013.01); *F15B 1/26* (2013.01); *F15B 11/162* (2013.01); *F15B 11/20* (2013.01); *F15B 13/022* (2013.01); *F15B 13/027* (2013.01); *F16K 15/063* (2013.01); *F16K 31/363* (2013.01); *F15B 2211/41527* (2013.01); *F15B 2211/522* (2013.01); *F15B 2211/781* (2013.01)

(58) Field of Classification Search
CPC ...... F15B 11/162; F15B 13/07; F15B 13/027; F15B 2211/31529; F15B 2211/329; F15B 2211/36; F15B 2211/41527; F15B 2211/428; F16K 31/363; F16K 17/06
See application file for complete search history.

(56) References Cited

U.S. PATENT DOCUMENTS

| | | | | |
|---|---|---|---|---|
| 4,742,846 | A * | 5/1988 | DiBartolo | ............. F16K 17/065 137/469 |
| 10,876,552 | B2 * | 12/2020 | Kutre | .................... F15B 21/006 |
| 2003/0106588 | A1 * | 6/2003 | Zahe | ...................... F16K 17/10 137/491 |
| 2011/0139260 | A1 * | 6/2011 | Dornbach | .......... G05D 16/2024 137/12 |
| 2019/0368516 | A1 * | 12/2019 | Bianchi | ................. F15B 13/029 |

* cited by examiner

*Primary Examiner* — Atif H Chaudry
(74) *Attorney, Agent, or Firm* — McDonnell Boehnen Hulbert & Berghoff LLP (57) ABSTRACT

An example valve includes a valve piston configured to block fluid flow from a first port of the valve to a second port of the valve when the valve is in a closed position; a forward flow spring applying a first biasing force on the valve piston in a distal direction; a reverse flow spring applying a second biasing force on the valve piston in a proximal direction; and a pressure setting spring applying a third biasing force on a check element in the distal direction, wherein fluid from the first port applies a fluid force on the check element in the proximal direction, and fluid from a pilot port applies a respective fluid force on the check element in the distal direction.

20 Claims, 6 Drawing Sheets

602 — OPERATING A VALVE IN A CLOSED POSITION, WHEREIN THE VALVE COMPRISES (I) A VALVE PISTON CONFIGURED TO BLOCK FLUID FLOW FROM A FIRST PORT OF THE VALVE TO A SECOND PORT OF THE VALVE, (II) A FORWARD FLOW SPRING APPLYING A FIRST BIASING FORCE ON THE VALVE PISTON IN A DISTAL DIRECTION, (III) A REVERSE FLOW SPRING APPLYING A SECOND BIASING FORCE ON THE VALVE PISTON IN A PROXIMAL DIRECTION, AND (IV) A PRESSURE SETTING SPRING APPLYING A THIRD BIASING FORCE ON A CHECK ELEMENT IN THE DISTAL DIRECTION, WHEREIN FLUID FROM THE FIRST PORT APPLIES A FLUID FORCE ON THE CHECK ELEMENT IN THE PROXIMAL DIRECTION, AND FLUID FROM A PILOT PORT APPLIES A RESPECTIVE FLUID FORCE ON THE CHECK ELEMENT IN THE DISTAL DIRECTION, WHEREIN THE CHECK ELEMENT IS SEATED WHEN THE VALVE IS IN THE CLOSED POSITION

604 — OPERATING THE VALVE IN A FIRST MODE OF OPERATION, WHEREIN THE FLUID FORCE OF FLUID FROM THE FIRST PORT OVERCOMES THE THIRD BIASING FORCE OF THE PRESSURE SETTING SPRING AND THE RESPECTIVE FLUID FORCE OF FLUID FROM THE PILOT PORT, THEREBY UNSEATING THE CHECK ELEMENT AND ALLOWING PILOT FLUID TO FLOW FROM THE FIRST PORT TO THE PILOT PORT, WHEREIN A FIRST NET FLUID FORCE IS APPLIED ON THE VALVE PISTON THAT OVERCOMES THE FIRST BIASING FORCE OF THE FORWARD FLOW SPRING, CAUSING THE VALVE PISTON TO MOVE IN THE PROXIMAL DIRECTION AND ALLOW FLUID FLOW FROM THE FIRST PORT TO THE SECOND PORT

606 — OPERATING THE VALVE IN A SECOND MODE OF OPERATION, WHEREIN A SECOND NET FLUID FORCE IS APPLIED ON THE VALVE PISTON THAT OVERCOMES THE SECOND BIASING FORCE OF THE REVERSE FLOW SPRING, CAUSING THE VALVE PISTON TO MOVE IN THE DISTAL DIRECTION AND ALLOW FLUID FLOW FROM THE SECOND PORT TO THE FIRST PORT

FIG. 6

SEQUENCE VALVE WITH A REVERSE FREE FLOW CONFIGURATION INTEGRATED THEREWITH

BACKGROUND

A hydraulic valve directs the flow of a liquid medium, usually oil, through a hydraulic system. The direction of the oil flow is determined by the position of a spool or a poppet. An example valve can have a first port where pressurized fluid is received and a second port connected to a hydraulic actuator. When pressurized fluid at the first port exceeds a particular pressure level, the valve opens and fluid flows from the first port to the second port to move the hydraulic actuator in a particular direction. In some applications, it may desirable to allow for reverse flow from the second port to the first port to allow the hydraulic actuator to move in an opposite direction. This reverse flow feature can be accomplished by having an additional valve, which can add cost and complexity to the system. Further, some existing valves have a high cracking pressure at which reverse flow is allowed, due to seal friction among other factors, which might not be desirable.

It is with respect to these and other considerations that the disclosure made herein is presented.

SUMMARY

The present disclosure describes implementations that relate to a sequence valve with a reverse free flow configuration integrated therewith.

In a first example implementation, the present disclosure describes a valve. The valve includes: a valve piston configured to block fluid flow from a first port of the valve to a second port of the valve when the valve is in a closed position; a forward flow spring applying a first biasing force on the valve piston in a distal direction; a reverse flow spring applying a second biasing force on the valve piston in a proximal direction; and a pressure setting spring applying a third biasing force on a check element in the distal direction, wherein fluid from the first port applies a fluid force on the check element in the proximal direction, and fluid from a pilot port applies a respective fluid force on the check element in the distal direction, wherein the check element is seated when the valve is in the closed position. The valve operates in: (i) a first mode of operation, wherein the fluid force of fluid from the first port overcomes the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port, and (ii) a second mode of operation, wherein a second net fluid force is applied on the valve piston that overcomes the second biasing force of the reverse flow spring, causing the valve piston to move in the distal direction and allow fluid flow from the second port to the first port.

In a second example implementation, the present disclosure describes a hydraulic system. The hydraulic system includes: a source of fluid flow; a fluid reservoir; a first hydraulic cylinder actuator having a first chamber, a second chamber, and a first actuator piston; a second hydraulic cylinder actuator having a third chamber, a fourth chamber, and a second actuator piston; and the valve of the first example implementation, wherein the first port of the valve is fluidly-coupled to the first chamber of the first hydraulic cylinder actuator, and wherein the second port of the valve is fluidly-coupled to the third chamber of the second hydraulic cylinder actuator.

In a third example implementation, the present disclosure describes a method. The method includes: operating the valve of the first example implementation in the closed position, the first mode of operation, and the second mode of operation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 6 is a flowchart of a method for operating a valve, in accordance with an example implementation.

DETAILED DESCRIPTION

In some example applications, two or more actuators or circuit are required to operate in sequence. For instance, respective pistons of two hydraulic cylinders may be required to stroke in a planned sequence. With two or more cylinders controlled by a single directional valve, the piston of the cylinder with the lowest resistance strokes first. If the actuator with the least resistance is first in the sequence, the circuit runs smoothly without other valving.

When the cylinder with the piston that moves first has the highest resistance, a single directional control might not work. A separate directional valve for each cylinder is one way to sequence such a circuit. Energizing one solenoid extends the first cylinder. When the first cylinder contacts a limit switch, it energizes a second solenoid, causing the piston of the second cylinder to stroke. With this type of sequencing circuit, the first cylinder may lose holding power when the second directional valve shifts. It may require other valves to make sure the first cylinder generates and maintains the force required both before and during the second cylinder's stroke.

Another way to force fluid to take the path of greatest resistance is to use a pressure-control valve that can be referred to as a sequence valve. Within examples, a sequence valve is a pressure-operated, normally-closed, poppet or spool valve that opens at a particular set pressure, which may be adjustable. In some example configurations, a sequence valve can have a spring acting directly on the spool or poppet, and in other examples, a sequence valve may be pilot-operated.

An example sequence valve can have a first port, a second port, and a third port that can be referred to as a drain port or pilot port. Fluid at the first port of the valve does not flow to the second port as long as the difference between pressure level of fluid at the first port and pressure level of fluid at the pilot port is less than a pressure setting (i.e., a predetermined pressure level). This allows fluid to flow to a first cylinder to extend a piston therein.

When the piston of the first cylinder reaches the end of its stroke, pressure level increases as the first cylinder does not accept more fluid flow. Pressure level can increase until the pressure differential between the first port and the pilot port exceeds the pressure setting, causing the valve to open and allow fluid flow from the first port to the second port, thereby allowing fluid flow to a second cylinder to extend its piston. As such, the pistons move in sequence. When the pistons are commanded to retract, it may be desirable to allow fluid to flow in reverse from the second port to the first port of the valve without adding a separate valve.

Disclosed herein is a valve configured to operate as a sequence valve having a first port, a second port, and a pilot port. The valve blocks fluid flow at the first port as long as the difference between pressure level at the first port and the pilot port is less than a threshold pressure level value (i.e., the pressure setting of the valve). Once the difference between pressure level at the first port and the pilot port reaches or exceeds the threshold pressure level value, and regardless of pressure level at the second port, the valve opens and fluid flows from the first port to the second port.

Further, the disclosed valve allows reverse free flow from the second port to the first port. The reverse free flow is allowed at a lower crack pressure compared to conventional valves due to the lack of a seal and also due to configuring the valve such that a pressure differential acts on a full surface area of a valve piston, thereby increasing the fluid force acting against a spring that keeps the valve closed for flow from the second port to the first port. As such, lower pressure levels are capable of overcoming the spring and allowing reverse flow.

Figure 1:
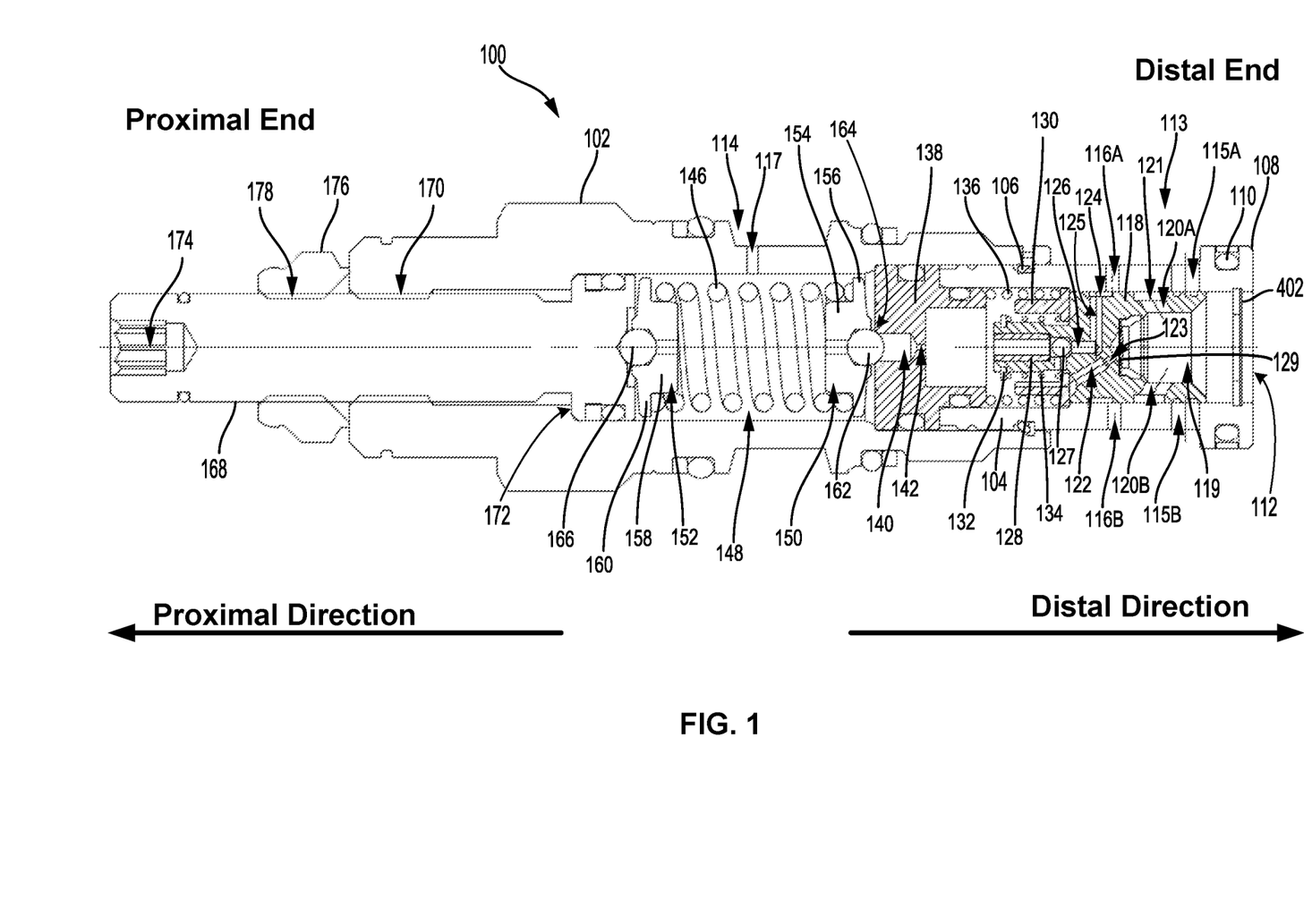
FIG. 1 illustrates a cross-sectional side view of a valve in a closed position, in accordance with an example implementation.

FIG. 1 illustrates a cross-sectional side view of a valve 100 in a closed position, in accordance with an example implementation. The valve 100 may be inserted or screwed into a manifold having ports corresponding to ports of the valve 100 described below, and can thus fluidly couple the valve 100 to other components of a hydraulic system.

The valve 100 includes a housing 102 that includes a longitudinal cylindrical cavity therein. The valve 100 also includes a sleeve 104 received at a distal end of the housing 102. The sleeve 104 can be retained to the housing 102 via a retention ring 106 disposed in an annular space formed by an exterior annular groove formed in the sleeve 104 and a corresponding interior annular groove formed in the housing 102.

The width of the grooves in which the retention ring 106 is disposed may be made larger than a diameter or width of the retention ring 106. With this configuration, the sleeve 104 is "floating" relative to the housing 102 and is allowed to have some axial "play" during operation of the valve 100. In conventional valves, a sleeve is typically swaged-in, or screwed via threaded engagement into, and might not be configured to have such axial "play." Such configuration of conventional valve is more expensive due to the cost associated with swaging or machining threads. Further, as the sleeve 104 is allowed to float within the housing 102, and is thus allowed to move axially within a cavity of the manifold relative to the housing 102, the sleeve 104 is capable of compensating for any misalignment.

A distal end of the sleeve 104 can have an enlarged diameter section 108 configured to have a seal 110 (e.g., an O-ring). When the valve 100 is inserted into a manifold, the seal 110 precludes leakage around the valve 100.

The valve 100 includes a first port 112, a second port 113, and a third port that can be referred to as a pilot port 114. The first port 112 is defined at a nose or distal end of the sleeve 104, whereas the second port 113 and the pilot port 114 are disposed laterally with respect to (i.e., on the side of) the sleeve 104 and the housing 102. The second port 113 can include a first set of cross-holes that can be referred to as main flow cross-holes, such as main flow cross-hole 115A and main flow cross-hole 115B, disposed in a circumferential array about an exterior surface of the sleeve 104.

The second port 113 can also include a second set of cross-holes that can be referred to as reverse flow pilot cross-holes, such as reverse flow pilot cross-hole 116A and reverse flow pilot cross-hole 116B, disposed in a circumferential array about the exterior surface of the sleeve 104. As depicted in FIG. 1, the reverse flow pilot cross-holes 116A, 116B are axially-spaced from the main flow cross-holes 115A, 115B along a length of the sleeve 104. The term "hole" is used generally herein to indicate a hollow place (e.g., cavity) in a solid body or surface, for example. The term "cross-hole" is used herein to encompass any type of opening (e.g., slot, window, hole, etc.) that crosses a path of, or is formed transverse relative to, another hole, cavity, or channel.

The pilot port 114 includes one or more cross-holes that can be referred to as forward flow pilot cross-holes, such as forward flow pilot cross-hole 117. The forward flow pilot cross-hole 117 is formed in the housing 102.

The sleeve 104 includes a respective longitudinal cylindrical cavity therein, and the valve 100 includes a valve piston 118 that is axially-movable within the longitudinal cylindrical cavity of the sleeve 104. The term "piston" is used herein to encompass any type of movable element, such as a spool-type movable element or a poppet-type movable element.

The valve piston 118 is disposed, and slidably-accommodated, in the longitudinal cylindrical cavity of the sleeve 104. The term "slidably accommodated" is used herein to indicate that a first component (e.g., the valve piston 118) is positioned relative to a second component (e.g., the sleeve 104) with sufficient clearance therebetween, enabling movement of the first component relative to the second component in the proximal and distal directions. As such, the first component (e.g., valve piston 118) is not stationary, locked, or fixedly disposed in the valve 100, but rather, is allowed to move relative to the second component (e.g., the sleeve 104).

The valve piston 118 has a main chamber 119 formed therein and has piston cross-holes 120A, 120B disposed in a circumferential array about an exterior surface of the valve piston 118. Further, the valve piston 118 has an annular chamber or annular groove 121 formed between the exterior surface of the valve piston 118 and the interior surface of the sleeve 104. The annular groove 121 is fluidly-coupled to the piston cross-holes 120A, 120B, which in turn are fluidly-coupled to the main chamber 119.

As shown in FIG. 1, in the closed position, where the valve 100 blocks fluid flow between the first port 112 and the second port 113, the annular groove 121 is blocked by the sleeve 104. Further, the valve piston 118 blocks the main flow cross-holes 115A, 115B. The term "block" is used throughout herein to indicate substantially preventing fluid flow except for minimal or leakage flow of drops per minute, for example.

The valve piston 118 further includes a plurality of channels or holes. For example, the valve piston 118 has a slanted channel or slanted cross-hole 122. A portion of the slanted cross-hole 122, closer to the main chamber 119, has a narrower diameter to form an orifice 123.

The valve piston 118 further includes an annular groove 124 that is fluidly-coupled or in fluid communication with the reverse flow pilot cross-hole 116A when the valve 100 is in the closed position shown in FIG. 1. The valve piston 118 also includes a radial channel or cross-hole 125 and a longitudinal channel 126. The cross-hole 125 fluidly couples the annular groove 124 to the longitudinal channel 126. The longitudinal channel 126 varies in diameter along its length to accommodate a ball 127 and a roll pin 128.

In an example, the valve 100 includes a filter 129 swaged in a metal soft ring and disposed within the valve piston 118. The filter 129 is configured to filter contaminants from fluid before flowing through the orifice 123.

The valve 100 further includes a bushing 130 disposed within the sleeve 104 and abutting the valve piston 118. As described below, the bushing 130 is axially-movable with the valve piston 118 in the proximal direction when the valve 100 operates in a first mode of operation.

Figure 2A:
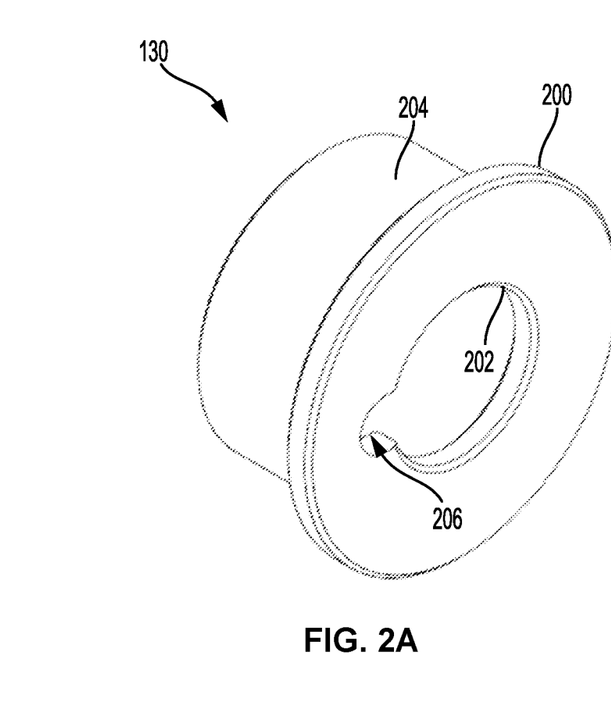
FIG. 2A illustrates a perspective view of a bushing of the valve of FIG. 1, in accordance with an example implementation.
Figure 2B:
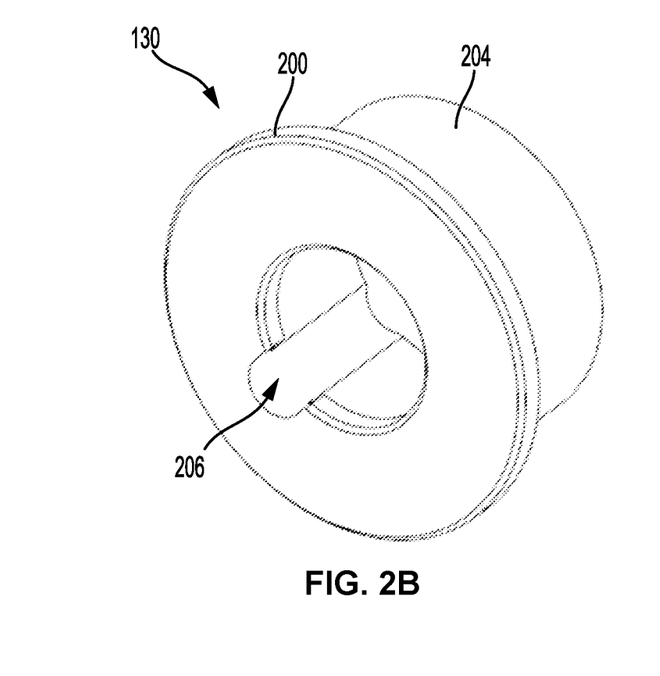
FIG. 2B illustrates a different perspective view of the bushing of FIG. 2A, in accordance with an example implementation.

FIG. 2A illustrates a perspective view of the bushing 130, and FIG. 2B illustrates a different perspective view of the bushing 130, in accordance with an example implementation. As shown in FIG. 2A-2B, the bushing 130 has a first flange 200 and a second flange 202. The term "flange" is used herein to indicate a rim or edge projecting from a cylindrical portion 204 of the bushing 130. In the example implementation of the bushing 130 shown in the figures, the first flange 200 is an external flange (i.e., the rim protrudes radially-outward), whereas the second flange 202 is an internal flange (i.e., the rim protrudes radially-inward). Further, the bushing 130 includes a slot 206 that allows for fluid flow through the bushing 130.

Referring back to FIG. 1, the valve 100 has a spring retaining ring 132 disposed in a groove defined in the exterior surface of the valve piston 118. The valve 100 includes reverse flow spring 134 disposed around an exterior peripheral surface of the valve piston 118 between the second flange 202 of the bushing 130 and the spring retaining ring 132. The reverse flow spring 134 applies a biasing force on the valve piston 118, via the spring retaining ring 132, in the proximal direction.

The valve 100 further includes a forward flow spring 136 disposed about the exterior peripheral surface of the cylindrical portion 204 of the bushing 130 between the first flange 200 of the bushing 130 and a seat member 138. The seat member 138 is fixedly disposed at a proximal end of the sleeve 104. The distal end of the forward flow spring 136 rests against the first flange 200 of the bushing 130, and thus the forward flow spring 136 applies a biasing force on the bushing 130 in the distal direction.

The reverse flow spring 134 is weaker than the forward flow spring 136. For example, the reverse flow spring 134 can apply a biasing force on the valve piston 118 of about 0.1 pound-force, whereas the forward flow spring 136 can apply a respective biasing force on the valve piston 118 of about 3.5 pound-force. The seat member 138 has longitudinal channel 140 comprising an orifice 142 at its distal end.

The valve 100 further includes a pressure setting spring 146 disposed within a pilot spring chamber 148. The pressure setting spring 146 is disposed or retained between a distal spring cap 150 and a proximal spring cap 152. The spring caps 150, 152 can also be referred to as spring guides or spring retainers.

The distal spring cap 150 has a cylindrical portion 154 that operates as a guide for the pressure setting spring 146, which is disposed partially about the exterior surface of the cylindrical portion 154. The distal spring cap 150 also has radial protrusions 156 against which the distal end of the pressure setting spring 146 rests.

In the example implementation shown in FIG. 1, the proximal spring cap 152 is configured similar to the distal spring cap 150. In this example, the proximal spring cap 152 has a respective cylindrical portion 158 about the exterior surface of which the pressure setting spring 146 is partially disposed, and has respective radial protrusions 160 against which the proximal end of the pressure setting spring 146 rests. In other example, implementations, however, the spring caps can be configured differently.

In the example implementation of FIG. 1, the distal spring cap 150 has a cavity in which a blocking element or check element 162 is disposed. In the example implementation shown in the Figures, the check element 162 is configured as a ball. However, any other type of check element (e.g., a poppet) can be used instead of a ball. The check element 162 is seated at a seat 164 formed in the seat member 138 at the proximal end of the longitudinal channel 140. With this configuration, the pressure setting spring 146 is configured to apply a biasing force on the check element 162 via the distal spring cap 150 toward the seat 164.

Similarly, the proximal spring cap 152 has a cavity in which a ball 166 is disposed. The valve 100 can further include a spring preload adjustment pin 168 (e.g., a movable piston) interfacing with the ball 166 of the proximal spring cap 152. The spring preload adjustment pin 168 is threadedly coupled to the housing 102 at threads 170. The threads 170 are configured such that as the spring preload adjustment pin 168 rotates, it moves axially to compress or decompress the pressure setting spring 146 via the proximal spring cap 152.

For example, the threads 170 can be configured such that if the spring preload adjustment pin 168 rotates in a counterclockwise direction, the spring preload adjustment pin 168 moves in the proximal direction, thereby relaxing or decompressing the pressure setting spring 146. The spring preload adjustment pin 168 can move in the proximal direction until it reaches a shoulder 172 formed in the housing 102, which operates as a stop for the spring preload adjustment pin 168. In this example, if the spring preload adjustment pin 168 rotates in a clockwise direction, the spring preload adjustment pin 168 moves in the distal direction, thereby compressing the pressure setting spring 146 via the proximal spring cap 152.

With this configuration, the spring preload adjustment pin 168 operates as a set screw where a tool can be inserted into a cavity 174 at the head of the spring preload adjustment pin 168 to rotate it and adjust the length of the pressure setting spring 146. Adjusting the length of the pressure setting spring 146 changes the biasing force (e.g., changes the preload of the pressure setting spring 146) that the pressure setting spring 146 applies on the distal spring cap 150, which is in turn applied to the check element 162, in the distal direction. When the pressure setting spring 146 is compressed (i.e., the spring preload adjustment pin 168 moves in the distal direction), the biasing force of the pressure setting spring 146 increases. On the other hand, when the pressure setting spring 146 is decompressed (i.e., the spring preload adjustment pin 168 moves in the proximal direction), the biasing force of the pressure setting spring 146 decreases.

The valve 100 can further include a lock nut 176 that engages the spring preload adjustment pin 168 via threads 178. Once the spring preload adjustment pin 168 is rotated to a desired position at which the pressure setting spring 146 applies a desired force on the check element 162 toward the seat member 138, the lock nut 176 can be used to secure the orientation (i.e., the rotational position) of the spring preload adjustment pin 168 and the resulting position of the proximal spring cap 152, and thus the length and biasing force of the pressure setting spring 146.

The biasing force of the pressure setting spring 146 determines the pressure setting of the valve 100. The pressure setting of the valve 100 is the pressure differential between the first port 112 and the pilot port 114 (i.e., the difference between pressure level of fluid at the first port 112 and a respective pressure level of fluid at the pilot port 114) at which the valve 100 can open to allow fluid flow from the first port 112 to the second port 113. Specifically, based on a spring rate of the pressure setting spring 146 and the length of the pressure setting spring 146, the pressure setting spring 146 exerts a particular biasing force on the check element 162 seated at the seat 164 in the distal direction, and the pressure setting is based on the particular biasing force of the pressure setting spring 146. As an example for illustration, the pressure setting of the valve 100 can be about 1000 pounds per square inch (psi).

The valve 100 is configured to operate in at least two modes of operation. In a first mode of operation, the valve 100 operates as a sequence valve configured to open a fluid path from the first port 112 to the second port 113 when the pressure differential between the first port 112 and the pilot port 114 reaches or exceeds the pressure setting determined by the pressure setting spring 146. In other words, the fluid force of fluid from the first port 112 acting on the check element 162 in the proximal direction overcomes both the biasing force of the pressure setting spring 146 and a respective fluid force of fluid from the pilot port 114 acting on the check element 162 in the distal direction.

Figure 3:
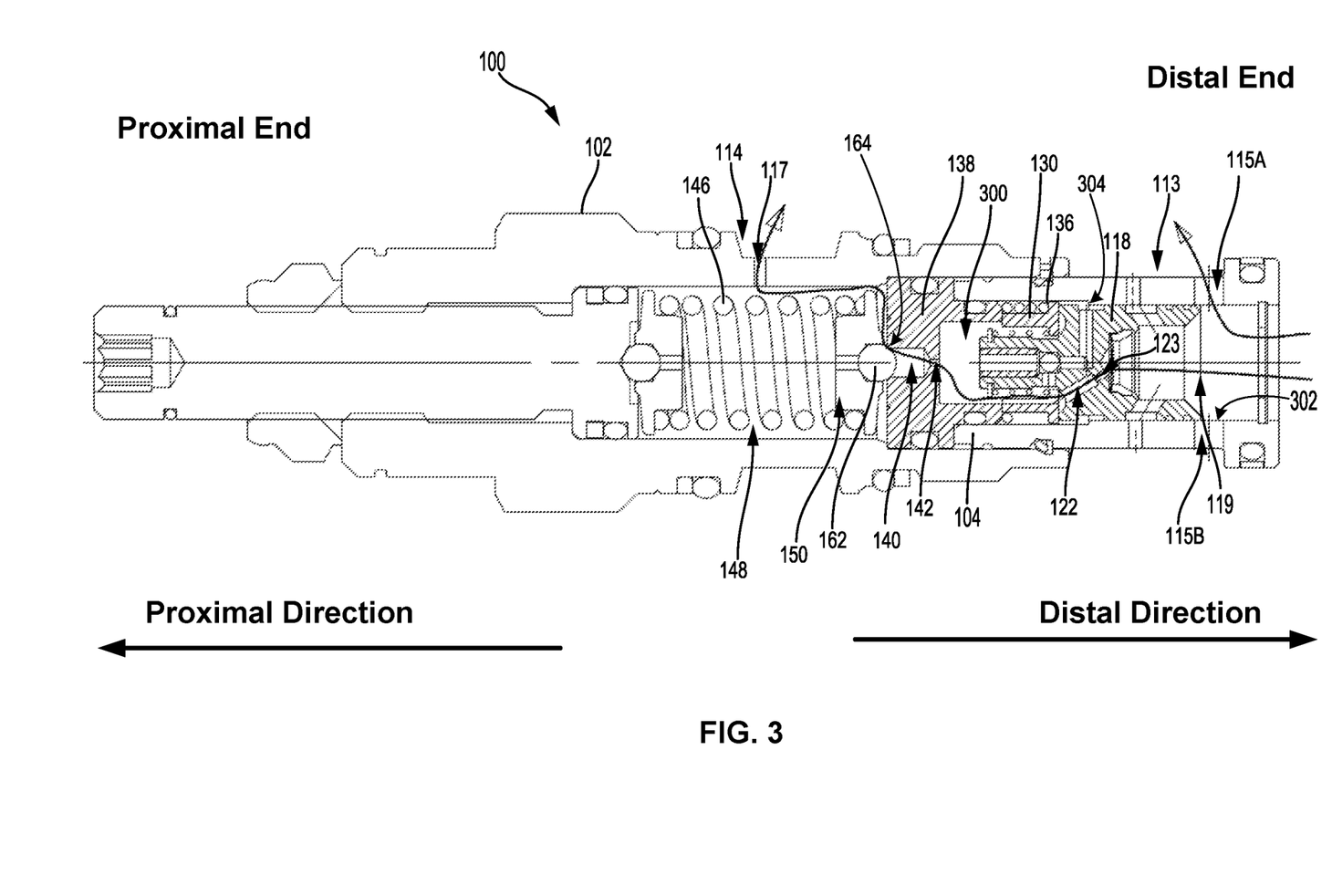
FIG. 3 illustrates a cross-sectional side view of the valve of FIG. 1 operating in a first mode of operation as a sequence valve allowing fluid flow from a first port to a second port, in accordance with an example implementation.

FIG. 3 illustrates a cross-sectional side view of the valve 100 operating in a first mode of operation as a sequence valve allowing fluid from the first port 112 to the second port 113, in accordance with an example implementation. Pressurized fluid at the first port 112 having a pressure level $P_1$ applies a first fluid force $F_1$ on the valve piston 118 in the proximal direction. Assuming the outer diameter (i.e., full diameter) of the valve piston 118 is D, a circular surface area A of the valve piston 118 on which the fluid acts can be determined as $$A = \pi \frac{D^2}{4}.$$

As such, the first fluid force can be determined as $$F_1 = P_1 \cdot \pi \frac{D^2}{4}.$$

Further, pressurized fluid received at the first port 112 is communicated through the main chamber 119, the orifice 123, the slanted cross-hole 122, and through the slot 206 of the bushing 130 to fill a chamber 300 in which the bushing 130 and the forward flow spring 136 are disposed. Fluid is also communicated through the orifice 142 and the longitudinal channel 140 of the seat member 138 to the check element 162. As such, fluid of the first port 112 applies a fluid force on the check element 162 in the proximal direction.

Fluid in the chamber 300 applies a second fluid force $F_2$ on the valve piston 118 in the distal direction. Fluid in the chamber 300 also acts on the circular surface area A of the valve piston 118. Assuming fluid in the chamber 300 has a pressure level $P_2$, the second fluid force $F_2$ can be determined as $$F_2 = P_2 \cdot \pi \frac{D^2}{4}.$$

Thus, a net fluid force equal to the difference between the first fluid force and the second fluid force, i.e., $$F_{Net} = F_1 - F_2 = (P_1 - P_2)\pi \frac{D^2}{4},$$

is applied to the valve piston 118.

As mentioned above, the pressure setting spring 146 applies a biasing force on the check element 162 in the distal direction. Further, the pilot spring chamber 148 is filled with fluid having pressure level $P_3$ of the pilot port 114, and such fluid applies a third fluid force on the distal spring cap 150 and the check element 162 in the distal direction along with the biasing force of the pressure setting spring 146, against the fluid force of fluid from the first port 112 acting on the check element 162 in the proximal direction.

As long as the pressure differential ($P_2$-$P_3$) between the chamber 300 and the pilot port 114 is not sufficient to overcome the biasing force of the pressure setting spring 146 (i.e., as long as the fluid force acting on the check element 162 in the proximal direction does not overcome the biasing force of the pressure setting spring 146 and the respective fluid force of fluid from the pilot port 114), the check element 162 remains seated at the seat 164. As the check element 162 remains seated at the seat 164, there is no fluid flow from the chamber 300 to the pilot spring chamber 148. In this case, fluid in the chamber 300 has substantially the same pressure as fluid at the first port 112. In other words $P_1$=$P_2$. In this case, the net fluid force $F_{Net}$=$F_1$-$F_2$ is zero and the valve piston 118 does not move axially (i.e., the valve piston 118 is balanced) as long as the pressure differential ($P_1$-$P_3$) is less than the pressure setting of the valve 100 determined by the pressure setting spring 146.

If the pressure level $P_1$ increases such that the pressure differential ($P_1$-$P_3$) exceeds the predetermined pressure setting determined by the pressure setting spring 146, the check element 162 is unseated, and fluid is allowed to flow from the first port 112 through the main chamber 119, the orifice 123, the slanted cross-hole 122, the slot 206, the orifice 142, and through the longitudinal channel 140, around the check element 162 (which is now unseated) to the pilot spring chamber 148. Fluid then flows through the forward flow pilot cross-hole 117 to the pilot port 114.

As a result of fluid flow through the orifices 123 and the slanted cross-hole 122, both of which operate as fluid restrictions, a pressure drop or pressure differential occurs thereacross. In other words, pressure level $P_2$ of fluid in the chamber 300 becomes less than the pressure level $P_1$ at the first port 112. As a result, a non-zero net force $F_{Net}$ acts on the valve piston 118 in the proximal direction and causes the valve piston 118 to move in the proximal direction when the net force exceeds the biasing force of the forward flow spring 136.

As the valve piston 118 moves, the bushing 130 moves therewith, thereby compressing the forward flow spring 136 until a new equilibrium position (as shown in FIG. 3) is achieved between the net fluid force and the spring force applied by the forward flow spring 136 on the bushing 130 and the valve piston 118. In this mode of operation, as the bushing 130 and the valve piston 118 move together, the reverse flow spring 134 is inactive (i.e., is not compressed).

As the valve piston 118 moves in the proximal direction, the distal end of the valve piston 118 can move past distal edges of the main flow cross-holes 115A, 115B. As a result, a flow area 302 is formed between the valve piston 118 and the sleeve 104, allowing fluid flow from the first port 112 through the main flow cross-holes 115A, 115B to the second port 113, which can be fluidly-coupled to a hydraulic actuator (e.g., hydraulic cylinder or motor).

As such, pressurized fluid at the first port 112 flows to the second port 113 after pressure level of fluid at the first port 112 has reached a pressure level that is sufficient to cause the pressure differential ($P_1$-$P_3$) to overcome the biasing force of the pressure setting spring 146. Once the pressure differential ($P_1$-$P_3$) falls below the pressure setting, the check element 162 is reseated at the seat 164. The pressure level in the chamber 300 becomes the same as pressure level at the first port 112, causing the net fluid force on the valve piston 118 to revert back to zero.

In this case, the forward flow spring 136 pushes the bushing 130 and the valve piston 118 back in the distal direction. The bushing 130 can move in the distal direction until it reaches a shoulder 304 formed in the sleeve 104, which precludes the bushing 130 from moving further in the distal direction. The valve piston 118 re-blocks the main flow cross-holes 115A, 115B, thereby blocking fluid flow from the first port 112 to the second port 113.

The valve 100 is further configured to operate in a second mode of operation that can be referred to as reverse free flow mode. The term "reverse flow" is used herein to indicate fluid flow from the second port 113 to the first port 112 (reverse flow direction) as opposed to fluid flow from the first port 112 to the second port (forward flow direction) in the first mode of operation. The term "free" indicates that fluid flow can occur at a substantially low pressure (e.g., 15 psi) at the second port 113.

Figure 4:
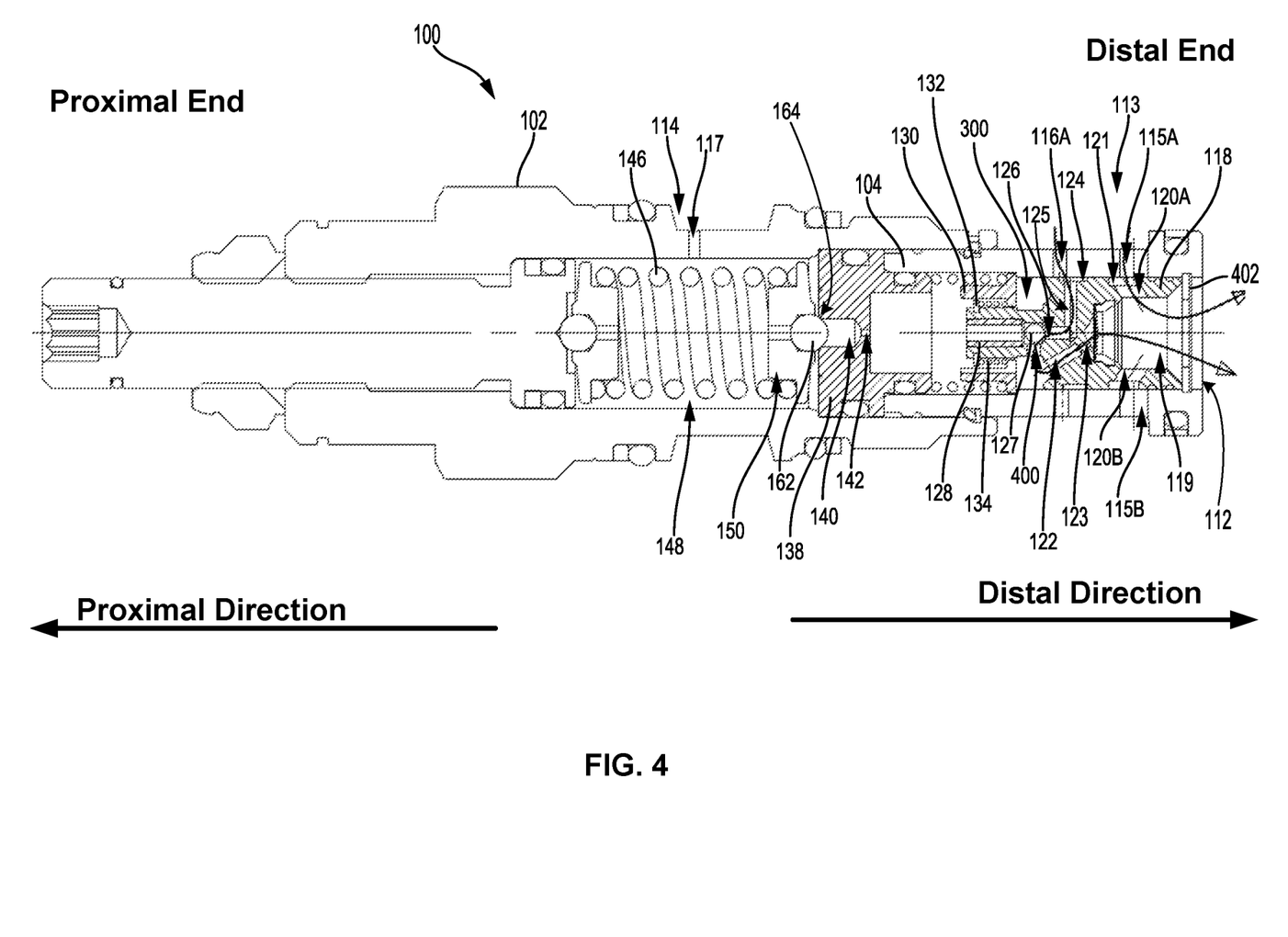
FIG. 4 illustrates a cross-sectional side view of the valve of FIG. 1 operating in a second mode of operation allowing reverse free flow from the second port to the first port, in accordance with an example implementation.

FIG. 4 illustrates a cross-sectional side view of the valve 100 operating in a second mode of operation allowing reverse free flow from the second port 113 to the first port 112, in accordance with an example implementation. As mentioned above, the second port 113 can be fluidly-coupled to a hydraulic actuator. For instance, the hydraulic actuator can be a hydraulic cylinder having a movable actuator piston. When the valve 100 operates in the first mode of operation, the actuator piston can extend as fluid flows from the first port 112 to the second port 113 then to the hydraulic cylinder. To retract the actuator piston, fluid flows in a reverse direction, from the hydraulic cylinder to second port 113. The valve 100 is configured such that a low pressure level (e.g., 15 psi) can cause the valve 100 to allow fluid flow from the second port 113 to the first port 112 to allow the actuator piston to retract.

Particularly, fluid at the second port 113 can flow through the reverse flow pilot cross-hole 116A, then through the annular groove 124, the cross-hole 125, and the longitudinal channel 126. Fluid then pushes the ball 127 in the proximal direction, opening a path through cross-hole 400 formed in the valve piston 118 to the chamber 300. The roll pin 128 operates as a stop for the ball 127. Fluid in the chamber 300 applies a first fluid force on the valve piston 118 in the distal direction equal to $$P_2 \cdot \pi \frac{D^2}{4}$$

as described above.

Fluid in the chamber 300 then flows through the slanted cross-hole 122 and the orifice 123 to the main chamber 119, and then flows to the first port 112. Fluid at the first port 112 applies a second fluid force on the valve piston 118 in the proximal direction equal to $$P_1 \cdot \pi \frac{D^2}{4}$$

as described above. Due to fluid flow through the slanted cross-hole 122 and the orifice 123, which operate as fluid restrictions, a respective pressure differential occurs between fluid in the chamber 300 and fluid at the first port 112. In other words, $P_2$ is greater than $P_1$. Thus, a net fluid force equal to the difference between the first fluid force and the second fluid force acts on the valve piston 118 in the distal direction.

As a result, the valve piston 118 moves in the distal direction, separating from the bushing 130, which is precluded from moving with the valve piston 118 because of the shoulder 304. As the valve piston 118 moves in the distal direction, the reverse flow spring 134 is compressed via the spring retaining ring 132. The valve piston 118 moves until an equilibrium is achieved between the spring force of the reverse flow spring 134 acting in the proximal direction and the net fluid force acting in the distal direction. The reverse flow spring 134 is configured as a weak spring (e.g., applying a 0.1 pound force) such that a low pressure level at the second port 113 (15 psi) is sufficient to overcome the reverse flow spring 134 and move the valve piston 118. In this mode of operation, the forward flow spring 136 does not exert a force on the main piston 118.

In an example, the valve 100 has an internal retainer 402 mounted within the sleeve 104. The internal retainer 402 operates as a stop for the valve piston 118 when the valve 100 operates in this reverse free flow mode. In other words, the valve piston 118 can move in the distal direction until it reaches the internal retainer 402 as depicted in FIG. 4.

Further, as shown in FIG. 4, as the valve piston 118 moves in the distal direction, the annular groove 121 overlaps with the main flow cross-holes 115A, 115B. As such, fluid is allowed to flow from the second port 113, through the main flow cross-holes 115A, 115B and the annular groove 121, then through the piston cross-holes 120A, 120B to the main chamber 119, then to the first port 112.

The valve 100 may offer several advantages compared to conventional valves. The valve integrates a sequence valve with a reverse flow valve in a single cartridge valve, reducing cost and complexity. Further, in the reverse flow mode illustrated in FIG. 4, the valve piston 118 does not have any seals, and thus no seal friction hinders its movement. Further, the fluid at the second port 113 and the first port 112 act on a surface area with the largest outer diameter (D) of the valve piston 118 as described above. This increases the fluid force for a given pressure level. As such, a low pressure level (e.g., atmospheric pressure) at the second port 113 is capable of "cracking" the valve 100 open. This contrasts with conventional valves that has seals mounted to movable member and are configured such that fluids act on a smaller cross sectional area of the movable member.

The valve 100 can be used as a sequence valve in a system. In such systems, the valve 100 can also be used for allowing reverse flow without having an additional valve.

Figure 5:
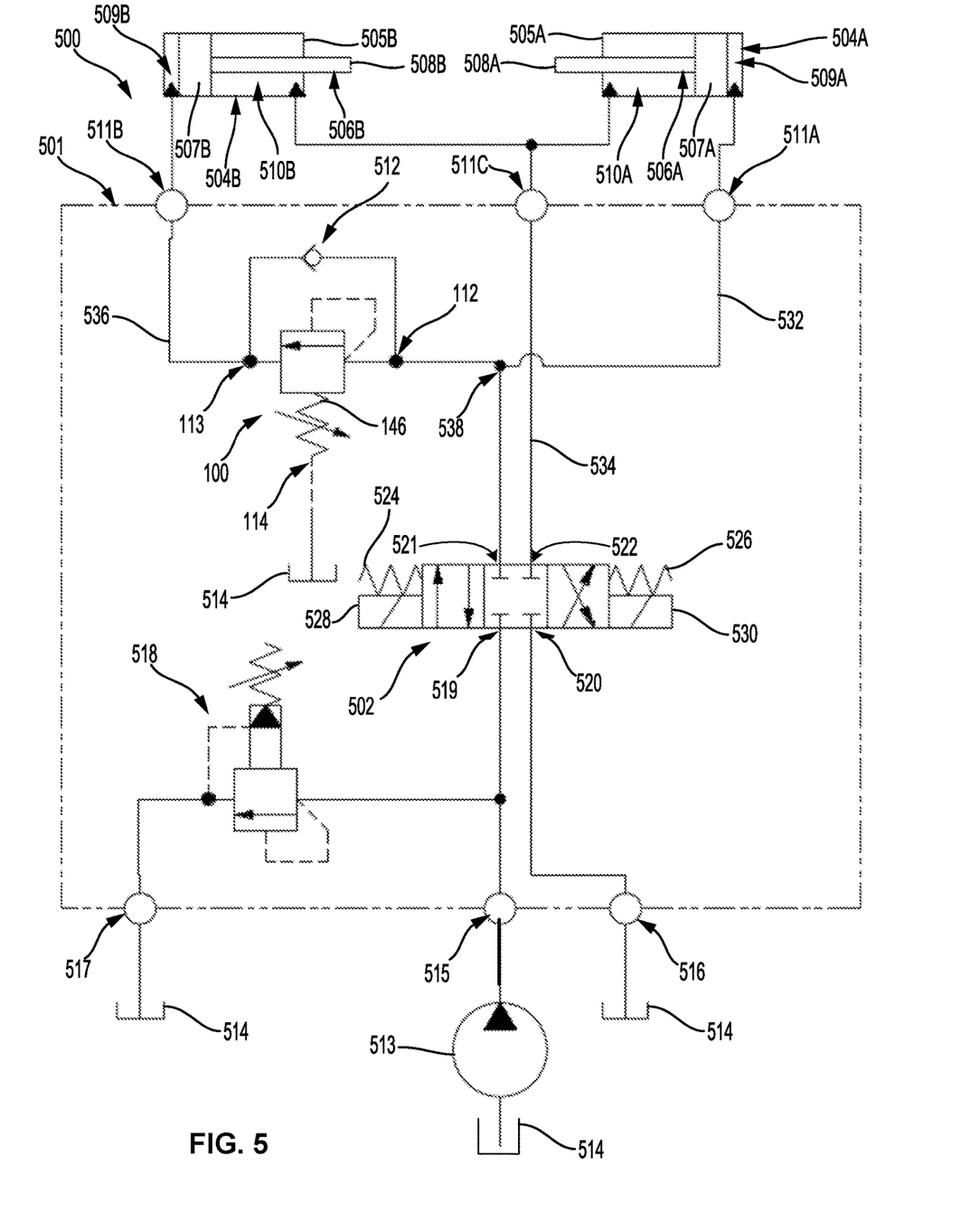
FIG. 5 illustrates a hydraulic system, in accordance with an example implementation.

FIG. 5 illustrates a hydraulic system 500, in accordance with an example implementation. The hydraulic system 500 can include a manifold 501 that houses several components such as a directional control valve 502 configured to control flow to and from hydraulic actuators such as hydraulic cylinder actuator 504A and hydraulic cylinder actuator 504B. A hydraulic cylinder is used herein as an example hydraulic actuator to illustrate operation of the hydraulic system 500. It should be understood that a different type of hydraulic actuator (e.g., a hydraulic motor) can be used. In other examples, rather than hydraulic actuators, the hydraulic system 500 can include two circuits that are activated in sequence, and the valve 100 is used to ensure that fluid is not provided to the second circuit until the first circuit is activated or has accomplished a particular operation.

The hydraulic cylinder actuator 504A includes a cylinder 505A and an actuator piston 506A that is slidably-accommodated in the cylinder 505A. The actuator piston 506A includes a piston head 507A and a rod 508A extending from the piston head 507A along a central longitudinal axis direction of the cylinder 505A. The piston head 507A divides the inner space of the cylinder 505A into a first chamber 509A and a second chamber 510A.

Similarly, the hydraulic cylinder actuator 504B includes a cylinder 505B and an actuator piston 506B that is slidably-accommodated in the cylinder 505B. The actuator piston 506B includes a piston head 507B and a rod 508B extending from the piston head 507B along a central longitudinal axis direction of the cylinder 505B. The piston head 507B divides the inner space of the cylinder 505B into a third chamber 509B and a fourth chamber 510B.

The manifold 501 has a first manifold workport 511A fluidly-coupled to the first chamber 509A of the hydraulic cylinder actuator 504A, and has a second manifold workport 511B fluidly-coupled to the third chamber 509B of the hydraulic cylinder actuator 504B. The manifold 501 further has a third manifold workport 511C fluidly-coupled to both the second chamber 510A of the hydraulic cylinder actuator 504A and the fourth chamber 510B of the hydraulic cylinder actuator 504B.

The hydraulic system 500 further includes a sequence valve with reverse free flow features integrated therewith valves such as the valve 100 symbolically or schematically represented in FIG. 5. The pressure setting spring 146 is represented symbolically with an arrow drawn across the pressure setting spring 146 representing adjustability of the pressure setting spring 146 via the spring preload adjustment pin 168. The valve 100 includes a check valve 512 that symbolically represents operations of the valve 100 in the reverse free flow mode described with respect to FIG. 4. The second port 113 of the valve 100 is fluidly-coupled to the third chamber 509B of the hydraulic cylinder actuator 504B via the second manifold workport 511B.

The hydraulic system 500 can include a source 513 of fluid flow (e.g., a pump) and a fluid reservoir 514. In an example, the source 513 can draw fluid from the fluid reservoir 514 and displace the fluid to the directional control valve 502. The fluid reservoir 514 can store fluid at a low pressure level such as atmospheric pressure level. The fluid reservoir 514 is drawn at several places in FIG. 5 to reduce visual clutter in the drawing. It should be understood that the hydraulic system 500 can have a single fluid reservoir.

The source 513 is fluidly-coupled to a manifold inlet port 515, and the fluid reservoir 514 is fluidly-coupled to a manifold return port 516 and another manifold return port 517. Further, the pilot port 114 of the valve 100 is fluidly-coupled to the fluid reservoir 514.

In an example, the hydraulic system 500 can include a pressure relief valve 518 that opens a fluid path from the source 513 to the fluid reservoir 514 via the manifold return port 517 if pressure level at the outlet of the source 513 exceeds a particular pressure level. This way, the hydraulic system 500 is protected from over-pressurization.

The directional control valve 502 can include four ports: (i) an inlet port 519 that is fluidly-coupled to the source 513 (via the manifold inlet port 515), (ii) a return port 520 that is fluidly-coupled to the fluid reservoir 514 (via the manifold return port 516), (iii) a first valve workport 521 that is fluidly-coupled to the first chamber 509A (via the first manifold workport 511A) and to the first port 112 of the valve 100, and (iv) a second valve workport 522 that is fluidly-coupled to the second chamber 510A and the fourth chamber 510B via the third manifold workport 511C.

In an example, the directional control valve 502 can be as spool type valve having a spool that is axially-movable within a bore in a valve body of the directional control valve 502. In this example, the spool can be biased to a neutral position by a first spring 524 and a second spring 526. In such neutral position, the spool blocks fluid flow to and from the hydraulic cylinder actuators 504A, 504B.

The hydraulic cylinder actuators 504A, 504B are configured to operate in sequence. Particularly, the hydraulic system 500 is configured such that the actuator piston 506A of the hydraulic cylinder actuator 504A extends first until it reaches its maximum stroke position (e.g., fully-extended position), while the actuator piston 506B of the hydraulic cylinder actuator 504B remains stationary. Then, the actuator piston 506B starts moving as pressure level at the first port 112 rises such that the pressure differential between pressure level at the first port 112 and the pressure level at the pilot port 114 exceeds the pressure setting of the valve 100. Example operations of the hydraulic system 500 are described next.

In an example, the directional control valve 502 can be electrically-actuated. For instance, the directional control valve 502 can have a first solenoid 528 and a second solenoid 530. When the first solenoid 528 is energized, e.g., via an electronic controller (not shown) of the hydraulic system 500, the directional control valve 502 operates in a first state in which the inlet port 519 is fluidly-coupled to the first valve workport 521, and the second valve workport 522 is fluidly-coupled to the return port 520.

In this first state, the directional control valve 502 directs fluid flow from the source 513 through the inlet port 519 and the first valve workport 521, through fluid line 532 to the first chamber 509A, causing the actuator piston 506A to extend. As long as pressure level in the fluid line 532 remains below the pressure setting of the valve 100 (assuming pressure level at the pilot port 114 is substantially zero), the valve 100 remains closed and no fluid is provided to the hydraulic cylinder actuator 504B. Fluid discharged from the second chamber 510A flows (via the third manifold workport 511C) through fluid line 534 to the second valve workport 522, then to the return port 520, then to the fluid reservoir 514 via the manifold return port 516.

Once the actuator piston 506A reaches its fully-extended position, the first chamber 509A does not accept more fluid flow. As such, pressure level of fluid in the fluid line 532, to which the first port 112 of the valve 100 is fluidly-coupled, rises. When the pressure level reaches the pressure setting of the valve 100 (i.e., when the pressure differential $P_1$-$P_3$ overcomes the pressure setting spring 146, regardless of the pressure at the second port 113), the valve 100 opens, thereby allowing fluid flow from the first port 112 to the second port 113, through fluid line 536 to the third chamber 509B of the hydraulic cylinder actuator 504B. As such, the actuator piston 506B extends.

This way, the hydraulic cylinder actuators 504A, 504B operate in sequence, i.e., the actuator piston 506A extends first until it reaches its fully-extended position, and then the actuator piston 506B starts extending. As an example for illustration, the fluid reservoir 514 can have fluid at 15 psi and the pressure setting of the valve 100 can be about 1000 psi. Fluid is provided from the source 513 to the first chamber 509A until the actuator piston 506A reaches its full stroke, and then pressure level in the first chamber 509A and at the first port 112 of the valve 100 rises. When pressure level at the first port 112 reaches or exceeds 1015 psi, the valve 100 opens and fluid is provided to the second port 113, then to the third chamber 509B to extend the actuator piston 506B.

Notably, pressure at the second port 113 is not additive to the pressure setting of the valve 100. In other words, the valve 100 opens when the difference in pressure level between the first port 112 and the pilot port 114 reaches or exceeds the pressure setting of the valve 100 regardless of the pressure level at the second port 113. For example, the pressure level at the second port 113 can be 0 psi, 100 psi, 500 psi, 800 psi, or 900 psi, and the valve 100 opens all the same when pressure level at the first port 112 reaches or exceeds 1015 psi.

To retract the actuator pistons 506A, 506B, the second solenoid 530 of the directional control valve 502 is energized, e.g., via an electronic controller (not shown) of the hydraulic system 500. When the second solenoid 530 is energized, the directional control valve 502 operates in a second state in which the inlet port 519 is fluidly-coupled to the second valve workport 522, and the first valve workport 521 is fluidly-coupled to the return port 520.

In this second state, the directional control valve 502 directs fluid flow from the source 513 through the inlet port 519 and the second valve workport 522, through the fluid line 534 and the third manifold workport 511C to the second chamber 510A and the fourth chamber 510B, causing the actuator pistons 506A, 506B to retract. Fluid discharged from the third chamber 509B of the hydraulic cylinder actuator 504B flows through the second manifold workport 511B and the fluid line 536 to the second port 113 of the valve 100. The valve 100 then operates in the second mode of operation (reverse free flow mode) described above with respect to FIG. 4, to allow fluid flow from the second port 113 to the first port 112. Notably, a low pressure level (e.g., 15 psi) at the third chamber 509B is sufficient to open the valve 100 and allow fluid flow to the first port 112.

Further, fluid discharged from the first chamber 509A of the hydraulic cylinder actuator 504A flows through the first manifold workport 511A and the fluid line 532, then joins with fluid discharged from the third chamber 509B (flowing through the valve 100) at junction 538. The combined fluid flow is provided to the first valve workport 521, then to the return port 520, then through the manifold return port 516 to the fluid reservoir 514.

FIG. 6 is a flowchart of a method 600 for operating the valve 100, in accordance with an example implementation. The method 600 is an example method that can be used with the valve 100 and the hydraulic system 500, for example.

The method 600 may include one or more operations, functions, or actions as illustrated by one or more of blocks 602-606. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 602, the method 600 includes operating the valve 100 in a closed position, wherein the valve 100 comprises (i) the valve piston 118 configured to block fluid flow from the first port 112 to the second port 113, (ii) the forward flow spring 136 applying a first biasing force on the valve piston 118 in a distal direction, (iii) a reverse flow spring 134 applying a second biasing force on the valve piston 118 in a proximal direction, and (iv) the pressure setting spring 146 applying a third biasing force on the check element 162 in the distal direction, wherein fluid from the first port 112 applies a fluid force on the check element 162 in the proximal direction, and fluid from the pilot port 114 applies a respective fluid force on the check element 162 in the distal direction, wherein the check element 162 is seated when the valve 100 is in the closed position.

At block 604, the method 600 includes operating the valve 100 in a first mode of operation (see FIG. 3), wherein the fluid force of fluid from the first port 112 overcomes the third biasing force of the pressure setting spring 146 and the respective fluid force of fluid from the pilot port 114, thereby unseating the check element 162 and allowing pilot fluid to flow from the first port 112 to the pilot port 114, wherein a first net fluid force is applied on the valve piston 118 that overcomes the first biasing force of the forward flow spring 136, causing the valve piston 118 to move in the proximal direction and allow fluid flow from the first port 112 to the second port 113.

At block 606, the method 600 includes operating the valve 100 in a second mode of operation, wherein a second net fluid force is applied on the valve piston 118 that overcomes the second biasing force of the reverse flow spring 134, causing the valve piston 118 to move in the distal direction and allow fluid flow from the second port 113 to the first port 112.

The method 600 can include other operations as described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term "substantially" or "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a valve piston configured to block fluid flow from a first port of the valve to a second port of the valve when the valve is in a closed position; a forward flow spring applying a first biasing force on the valve piston in a distal direction; a reverse flow spring applying a second biasing force on the valve piston in a proximal direction; and a pressure setting spring applying a third biasing force on a check element in the distal direction, wherein fluid from the first port applies a fluid force on the check element in the proximal direction, and fluid from a pilot port applies a respective fluid force on the check element in the distal direction, wherein the check element is seated when the valve is in the closed position, and wherein the valve operates in: (i) a first mode of operation, wherein the fluid force of fluid from the first port overcomes the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port, and (ii) a second mode of operation, wherein a second net fluid force is applied on the valve piston that overcomes the second biasing force of the reverse flow spring, causing the valve piston to move in the distal direction and allow fluid flow from the second port to the first port.

EEE 2 is the valve of EEE 1, wherein the valve piston comprises a fluid restriction formed therein, wherein when the valve operates in the first mode of operation, the pilot fluid flows through the fluid restriction, thereby causing a pressure differential about the valve piston, causing the first net fluid force to be applied to the valve piston, and wherein when the valve operates in the second mode of operation, fluid from the second port flows through the fluid restriction, thereby causing a respective pressure differential about the valve piston, causing the second net fluid force to be applied to the valve piston.

EEE 3 is the valve of any of EEEs 1-2, wherein the second port comprises: a main flow cross-hole, and a reverse flow pilot cross-hole, and wherein the pilot port comprises a forward flow pilot cross-hole, wherein (i) when the valve operates in the first mode of operation, the pilot fluid flows from the first port through the valve piston, then around the check element, which is unseated, then through the forward flow pilot cross-hole to the pilot port, and wherein upon the valve piston moving in the proximal direction, fluid flow from the first port through the main flow cross-hole to the second port, and (ii) when the valve operates in the second mode of operation, fluid from the second port flows through the reverse flow pilot cross-hole, then through the valve piston to the first port, and wherein upon the valve piston moving in the distal direction, fluid flows from the second port through the main flow cross-hole to the first port.

EEE 4 is the valve of EEE 3, further comprising: a housing comprising a longitudinal cylindrical cavity therein; and a sleeve disposed partially within longitudinal cylindrical cavity of the housing, wherein the sleeve comprises a respective longitudinal cylindrical cavity therein, wherein the valve piston is axially-movable within the respective longitudinal cylindrical cavity of the sleeve, wherein the first port is disposed at a distal end of the sleeve, wherein the main flow cross-hole and the reverse flow pilot cross-hole of the second port are formed in the sleeve, such that the reverse flow pilot cross-hole is axially-spaced from the main flow cross-hole along a length of the sleeve, and wherein the forward flow pilot cross-hole of the second port is formed in the housing.

EEE 5 is the valve of EEE 4, wherein the valve piston comprises a piston cross-hole, wherein when the valve operates in the second mode of operation, fluid flows from the second port through the main flow cross-hole, through the piston cross-hole, which overlaps the main flow cross-hole when the valve piston moves in the distal direction, then to the first port.

EEE 6 is the valve of any of EEEs 1-5, further comprising: a bushing configured to move with the valve piston as the valve piston moves in the proximal direction when the valve operates in the first mode of operation, and wherein the valve piston separates from the bushing as the valve piston moves in the distal direction when the valve operates in the second mode of operation.

EEE 7 is the valve of EEE 6, wherein the bushing comprises a slot through which fluid received at the first port is communicated to the check element.

EEE 8 is the valve of any of EEEs 6-7, wherein the bushing comprises: a cylindrical portion; a first flange against which the forward flow spring rests; and a second flange against which the reverse flow spring rests.

EEE 9 is the valve of EEE 8, further comprising: a seat member forming a seat at which the check element is seated, wherein the forward flow spring is disposed about the cylindrical portion of the bushing between the first flange and the seat member; and a spring retaining ring disposed about the valve piston, wherein the reverse flow spring is disposed between the second flange and the spring retaining ring.

EEE 10 is the valve of any of EEEs 1-9, wherein, when the valve operates in the first mode of operation, fluid at the first port applies a first fluid force on the valve piston in the proximal direction, wherein the valve piston comprises a fluid restriction configured to communicate fluid from the first port to a chamber, such that fluid in the chamber applies a second fluid force on the valve piston in the distal direction, wherein the first net fluid force is a difference between the first fluid force and the second fluid force.

EEE 11 is the valve of any of EEEs 1-10, wherein, when the valve operates in the second mode of operation, fluid at the second port applies a first fluid force on the valve piston in the distal direction, wherein the valve piston comprises a fluid restriction configured to communicate fluid from the second port to the first port, such that fluid at the first port applies a second fluid force on the valve piston in the proximal direction, wherein the second net fluid force is a difference between the first fluid force and the second fluid force.

EEE 12 is a hydraulic system comprising: a source of fluid flow; a fluid reservoir; a first hydraulic cylinder actuator having a first chamber, a second chamber, and a first actuator piston; a second hydraulic cylinder actuator having a third chamber, a fourth chamber, and a second actuator piston; and a valve comprising: (i) a first port that is fluidly-coupled to the first chamber of the first hydraulic cylinder actuator, (ii) a second port that is fluidly-coupled to the third chamber of the second hydraulic cylinder actuator, (iii) a pilot port, (iv) a valve piston configured to block fluid flow from the first port to the second port when the valve is in a closed position, (v) a forward flow spring applying a first biasing force on the valve piston in a distal direction, (vi) a reverse flow spring applying a second biasing force on the valve piston in a proximal direction, and (vii) a pressure setting spring applying a third biasing force on a check element in the distal direction, wherein fluid from the first port applies a fluid force on the check element in the proximal direction, and fluid from the pilot port applies a respective fluid force on the check element in the distal direction, wherein the check element is seated when the valve is in the closed position, wherein the valve operates in: (i) a first mode of operation, wherein fluid from the source of fluid flow fills the first chamber, causing the first actuator piston to move, wherein pressure level of fluid at the first port of the valve increases as the first actuator piston reaches a fully-extend position, wherein increasing pressure level at the first port causes the fluid force of fluid from the first port to overcome the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port, then to the third chamber to move the second actuator piston, and (ii) a second mode of operation, wherein the first port is fluidly-coupled to the fluid reservoir, wherein a second net fluid force is applied on the valve piston that overcomes the second biasing force of the reverse flow spring, causing the valve piston to move in the distal direction and allow fluid flow from the second port to the first port, thereby fluidly coupling the third chamber to the fluid reservoir.

EEE 13 is the hydraulic system of EEE 12, further comprising: a directional control valve configured to: direct fluid flow from: (i) the source of fluid flow to the first hydraulic cylinder actuator and the first port of the valve, and (ii) the first hydraulic cylinder actuator and the first port of the valve to the fluid reservoir.

EEE 14 is the hydraulic system of any of EEEs 12-13, wherein the valve further comprises: a bushing configured to move with the valve piston as the valve piston moves in the proximal direction when the valve operates in the first mode of operation, and wherein the valve piston separates from the bushing as the valve piston moves in the distal direction when the valve operates in the second mode of operation.

EEE 15 is the hydraulic system of EEE 14, wherein the bushing comprises a slot through which fluid received at the first port is communicated to the check element.

EEE 16 is the hydraulic system of any of EEEs 14-15, wherein the bushing comprises: a cylindrical portion; a first flange against which the forward flow spring rests; and a second flange against which the reverse flow spring rests.

EEE 17 is the hydraulic system of EEE 16, wherein the valve further comprises: a seat member forming a seat at which the check element is seated, wherein the forward flow spring is disposed about the cylindrical portion of the bushing between the first flange and the seat member; and a spring retaining ring disposed about the valve piston, wherein the reverse flow spring is disposed between the second flange and the spring retaining ring.

EEE 18 is a method comprising: operating a valve in a closed position, wherein the valve comprises (i) a valve piston configured to block fluid flow from a first port of the valve to a second port of the valve, (ii) a forward flow spring applying a first biasing force on the valve piston in a distal direction, (iii) a reverse flow spring applying a second biasing force on the valve piston in a proximal direction, and (iv) a pressure setting spring applying a third biasing force on a check element in the distal direction, wherein fluid from the first port applies a fluid force on the check element in the proximal direction, and fluid from a pilot port applies a respective fluid force on the check element in the distal direction, wherein the check element is seated when the valve is in the closed position; operating the valve in a first mode of operation, wherein the fluid force of fluid from the first port overcomes the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port; and operating the valve in a second mode of operation, wherein a second net fluid force is applied on the valve piston that overcomes the second biasing force of the reverse flow spring, causing the valve piston to move in the distal direction and allow fluid flow from the second port to the first port.

EEE 19 is the method of EEE 18, wherein operating the valve in the first mode of operation comprises: applying, by fluid at the first port, a first fluid force on the valve piston in the proximal direction, wherein the valve piston comprises a fluid restriction configured to communicate fluid from the first port to a chamber; and applying, by fluid in the chamber, a second fluid force on the valve piston in the distal direction, wherein the first net fluid force is a difference between the first fluid force and the second fluid force.

EEE 20 is the method of any of EEEs 18-19, wherein operating the valve in the second mode of operation comprises: applying, by fluid at the second port, a first fluid force on the valve piston in the distal direction, wherein the valve piston comprises a fluid restriction configured to communicate fluid from the second port to the first port; and applying, by fluid in communicated to the first port, a second fluid force on the valve piston in the proximal direction, wherein the second net fluid force is a difference between the first fluid force and the second fluid force.

What is claimed is:

1. A valve comprising:
a valve piston configured to block fluid flow from a first port of the valve to a second port of the valve when the valve is in a closed position;
a forward flow spring applying a first biasing force on the valve piston in a distal direction;
a reverse flow spring applying a second biasing force on the valve piston in a proximal direction; and
a pressure setting spring applying a third biasing force on a check element in the distal direction, wherein fluid from the first port applies a fluid force on the check element in the proximal direction, and fluid from a pilot port applies a respective fluid force on the check element in the distal direction, wherein the check element is seated when the valve is in the closed position, and wherein the valve operates in: (i) a first mode of operation, wherein the fluid force of fluid from the first port overcomes the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port, and (ii) a second mode of operation, wherein a second net fluid force is applied on the valve piston that overcomes the second biasing force of the reverse flow spring, causing the valve piston to move in the distal direction and allow fluid flow from the second port to the first port.

2. The valve of claim 1, wherein the valve piston comprises a fluid restriction formed therein, wherein when the valve operates in the first mode of operation, the pilot fluid flows through the fluid restriction, thereby causing a pressure differential about the valve piston, causing the first net fluid force to be applied to the valve piston, and wherein when the valve operates in the second mode of operation, fluid from the second port flows through the fluid restriction, thereby causing a respective pressure differential about the valve piston, causing the second net fluid force to be applied to the valve piston.

3. The valve of claim 1, wherein the second port comprises: a main flow cross-hole, and a reverse flow pilot cross-hole, and wherein the pilot port comprises a forward flow pilot cross-hole, wherein (i) when the valve operates in the first mode of operation, the pilot fluid flows from the first port through the valve piston, then around the check element, which is unseated, then through the forward flow pilot cross-hole to the pilot port, and wherein upon the valve piston moving in the proximal direction, fluid flow from the first port through the main flow cross-hole to the second port, and (ii) when the valve operates in the second mode of operation, fluid from the second port flows through the reverse flow pilot cross-hole, then through the valve piston to the first port, and wherein upon the valve piston moving in the distal direction, fluid flows from the second port through the main flow cross-hole to the first port.

4. The valve of claim 3, further comprising:
a housing comprising a longitudinal cylindrical cavity therein; and
a sleeve disposed partially within longitudinal cylindrical cavity of the housing, wherein the sleeve comprises a respective longitudinal cylindrical cavity therein, wherein the valve piston is axially-movable within the respective longitudinal cylindrical cavity of the sleeve, wherein the first port is disposed at a distal end of the sleeve, wherein the main flow cross-hole and the reverse flow pilot cross-hole of the second port are formed in the sleeve, such that the reverse flow pilot cross-hole is axially-spaced from the main flow cross-hole along a length of the sleeve, and wherein the forward flow pilot cross-hole of the second port is formed in the housing.

5. The valve of claim 4, wherein the valve piston comprises a piston cross-hole, wherein when the valve operates in the second mode of operation, fluid flows from the second port through the main flow cross-hole, through the piston cross-hole, which overlaps the main flow cross-hole when the valve piston moves in the distal direction, then to the first port.

6. The valve of claim 1, further comprising:
a bushing configured to move with the valve piston as the valve piston moves in the proximal direction when the valve operates in the first mode of operation, and wherein the valve piston separates from the bushing as the valve piston moves in the distal direction when the valve operates in the second mode of operation.

7. The valve of claim 6, wherein the bushing comprises a slot through which fluid received at the first port is communicated to the check element.

8. The valve of claim 6, wherein the bushing comprises:
a cylindrical portion;
a first flange against which the forward flow spring rests; and
a second flange against which the reverse flow spring rests.

9. The valve of claim 8, further comprising:
a seat member forming a seat at which the check element is seated, wherein the forward flow spring is disposed about the cylindrical portion of the bushing between the first flange and the seat member; and a spring retaining ring disposed about the valve piston, wherein the reverse flow spring is disposed between the second flange and the spring retaining ring.

10. The valve of claim 1, wherein, when the valve operates in the first mode of operation, fluid at the first port applies a first fluid force on the valve piston in the proximal direction, wherein the valve piston comprises a fluid restriction configured to communicate fluid from the first port to a chamber, such that fluid in the chamber applies a second fluid force on the valve piston in the distal direction, wherein the first net fluid force is a difference between the first fluid force and the second fluid force.

11. The valve of claim 1, wherein, when the valve operates in the second mode of operation, fluid at the second port applies a first fluid force on the valve piston in the distal direction, wherein the valve piston comprises a fluid restriction configured to communicate fluid from the second port to the first port, such that fluid at the first port applies a second fluid force on the valve piston in the proximal direction, wherein the second net fluid force is a difference between the first fluid force and the second fluid force.

12. A hydraulic system comprising:
a source of fluid flow;
a fluid reservoir;
a first hydraulic cylinder actuator having a first chamber, a second chamber, and a first actuator piston;
a second hydraulic cylinder actuator having a third chamber, a fourth chamber, and a second actuator piston; and
a valve comprising: (i) a first port that is fluidly-coupled to the first chamber of the first hydraulic cylinder actuator, (ii) a second port that is fluidly-coupled to the third chamber of the second hydraulic cylinder actuator, (iii) a pilot port, (iv) a valve piston configured to block fluid flow from the first port to the second port when the valve is in a closed position, (v) a forward flow spring applying a first biasing force on the valve piston in a distal direction, (vi) a reverse flow spring applying a second biasing force on the valve piston in a proximal direction, and (vii) a pressure setting spring applying a third biasing force on a check element in the distal direction, wherein fluid from the first port applies a fluid force on the check element in the proximal direction, and fluid from the pilot port applies a respective fluid force on the check element in the distal direction, wherein the check element is seated when the valve is in the closed position,
wherein the valve operates in: (i) a first mode of operation, wherein fluid from the source of fluid flow fills the first chamber, causing the first actuator piston to move, wherein pressure level of fluid at the first port of the valve increases as the first actuator piston reaches a fully-extend position, wherein increasing pressure level at the first port causes the fluid force of fluid from the first port to overcome the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port, then to the third chamber to move the second actuator piston, and (ii) a second mode of operation, wherein the first port is fluidly-coupled to the fluid reservoir, wherein a second net fluid force is applied on the valve piston that overcomes the second biasing force of the reverse flow spring, causing the valve piston to move in the distal direction and allow fluid flow from the second port to the first port, thereby fluidly coupling the third chamber to the fluid reservoir.

13. The hydraulic system of claim 12, further comprising:
a directional control valve configured to: direct fluid flow from: (i) the source of fluid flow to the first hydraulic cylinder actuator and the first port of the valve, and (ii) the first hydraulic cylinder actuator and the first port of the valve to the fluid reservoir.

14. The hydraulic system of claim 12, wherein the valve further comprises:
a bushing configured to move with the valve piston as the valve piston moves in the proximal direction when the valve operates in the first mode of operation, and wherein the valve piston separates from the bushing as the valve piston moves in the distal direction when the valve operates in the second mode of operation.

15. The hydraulic system of claim 14, wherein the bushing comprises a slot through which fluid received at the first port is communicated to the check element.

16. The hydraulic system of claim 14, wherein the bushing comprises:
a cylindrical portion;
a first flange against which the forward flow spring rests; and
a second flange against which the reverse flow spring rests.

17. The hydraulic system of claim 16, wherein the valve further comprises:
a seat member forming a seat at which the check element is seated, wherein the forward flow spring is disposed about the cylindrical portion of the bushing between the first flange and the seat member; and
a spring retaining ring disposed about the valve piston, wherein the reverse flow spring is disposed between the second flange and the spring retaining ring.

18. A method comprising:
operating a valve in a closed position, wherein the valve comprises (i) a valve piston configured to block fluid flow from a first port of the valve to a second port of the valve, (ii) a forward flow spring applying a first biasing force on the valve piston in a distal direction, (iii) a reverse flow spring applying a second biasing force on the valve piston in a proximal direction, and (iv) a pressure setting spring applying a third biasing force on a check element in the distal direction, wherein fluid from the first port applies a fluid force on the check element in the proximal direction, and fluid from a pilot port applies a respective fluid force on the check element in the distal direction, wherein the check element is seated when the valve is in the closed position;
operating the valve in a first mode of operation, wherein the fluid force of fluid from the first port overcomes the third biasing force of the pressure setting spring and the respective fluid force of fluid from the pilot port, thereby unseating the check element and allowing pilot fluid to flow from the first port to the pilot port, wherein a first net fluid force is applied on the valve piston that overcomes the first biasing force of the forward flow spring, causing the valve piston to move in the proximal direction and allow fluid flow from the first port to the second port; and
operating the valve in a second mode of operation, wherein a second net fluid force is applied on the valve piston that overcomes the second biasing force of the reverse flow spring, causing the valve piston to move in the distal direction and allow fluid flow from the second port to the first port.

19. The method of claim 18, wherein operating the valve in the first mode of operation comprises:
applying, by fluid at the first port, a first fluid force on the valve piston in the proximal direction, wherein the valve piston comprises a fluid restriction configured to communicate fluid from the first port to a chamber; and
applying, by fluid in the chamber, a second fluid force on the valve piston in the distal direction, wherein the first net fluid force is a difference between the first fluid force and the second fluid force.

20. The method of claim 18, wherein operating the valve in the second mode of operation comprises:
applying, by fluid at the second port, a first fluid force on the valve piston in the distal direction, wherein the valve piston comprises a fluid restriction configured to communicate fluid from the second port to the first port; and
applying, by fluid in communicated to the first port, a second fluid force on the valve piston in the proximal direction, wherein the second net fluid force is a difference between the first fluid force and the second fluid force.

* * * * *